United States Patent [19]

Clarke

[11] 4,076,119
[45] Feb. 28, 1978

[54] PACKAGING TRAY FOR A VIDEODISC

[75] Inventor: John William Clarke, Indianapolis, Ind.

[73] Assignee: Eli Lilly and Company, Indianapolis, Ind.

[21] Appl. No.: 663,656

[22] Filed: Mar. 4, 1976

[51] Int. Cl.² ..................... B65D 85/30; B65D 85/02
[52] U.S. Cl. .................................. 206/309; 206/303; 206/493
[58] Field of Search ............... 206/309, 310, 311, 312, 206/408, 509, 493, 821, 303; 229/2.5; 211/40; 242/71.8, 68.3

[56] References Cited
U.S. PATENT DOCUMENTS

| 1,940,088 | 12/1933 | Harrison | 206/309 |
| 2,688,490 | 9/1954 | Schumaker | 211/40 |
| 2,691,440 | 10/1954 | Spugios et al. | 206/312 |
| 2,785,797 | 3/1957 | Rice | 206/310 |
| 3,109,539 | 11/1963 | Turoff | 206/310 |
| 3,345,013 | 10/1967 | Nick | 242/71.8 |
| 3,685,646 | 8/1972 | Sy | 229/2.5 |
| 3,825,112 | 7/1974 | Schumaker et al. | 206/310 |

Primary Examiner—William T. Dixson, Jr.
Attorney, Agent, or Firm—Houston L. Swenson; Everet F. Smith

[57] ABSTRACT

A packaging tray for an entertainment or educational disc in which the tray is formed with plastic sheet material with upright retaining posts that extend through and adjacent the ends of a pair of apertures in the disc.

7 Claims, 5 Drawing Figures

4,076,119

PACKAGING TRAY FOR A VIDEODISC

BACKGROUND OF THE INVENTION

A recent addition into the educational and entertainment field has been videodiscs. These in appearance have features that are similar to those of a conventional phonograph record. However, a striking difference is the delicate nature of a videodisc. Videodiscs generally have grooves in them which are many times smaller than grooves found in a conventional phonograph record. Scratches in the grooves will cause considerably more damage to the disc. Thus, the delicate nature of a videodisc is such that its storage and handling is extremely critical. Consequently, a need has arisen to provide a package for storing videodiscs which will protect the record during storage as well as permitting it to be withdrawn and placed on its player without touching any of the grooves in the disc. The use of a standard record jacket without any other packaging component has been found to be unsatisfactory inasmuch as a person will tend to touch the grooves of the record as he removes it from its jacket.

SUMMARY OF THE INVENTION

My invention comprises the use of a packaging tray in conjunction with a record jacket or carton. This packaging tray may be formed from plastic material by conventional injection molding or thermoforming techniques. The tray has a cavity formed in it for closely receiving the videodisc and a number of upright retaining posts that extend through and adjacent the ends of apertures within the disc. Recessed areas underlying the disc apertures permit one to remove the disc from the tray by gripping the central unrecorded portion of the disc after the tray has been pulled from its jacket.

DESCRIPTION OF THE PREFERRED EMBODIMENT

Figure 1:
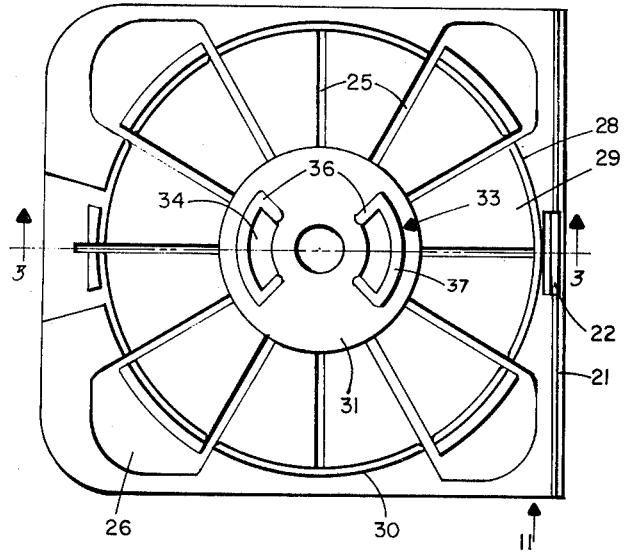
FIG. 1 is a top plan view of the packaging tray of my invention.
Figure 2:
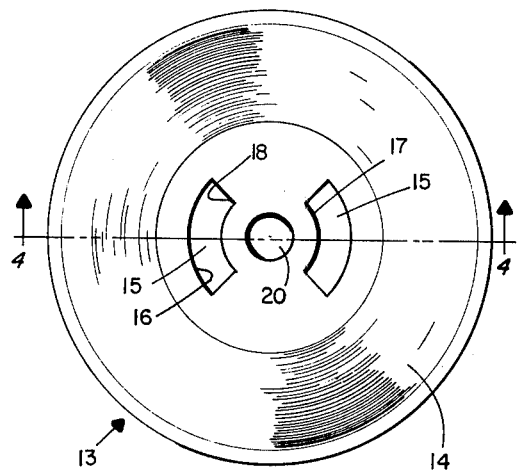
FIG. 2 is a top plan view of a videodisc.
Figure 3:
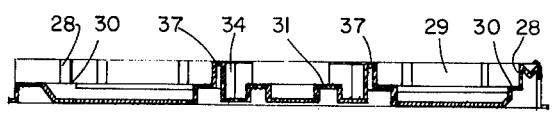
FIG. 3 is a side view in cross section taken along line 3—3 of FIG. 1.

Referring to FIG. 1, a packaging tray 11 is illustrated which may be formed of any type material having sufficient strength to support a record 13 as illustrated in FIG. 2. The preferred form of this tray may be obtained through the use of plastic sheet material that is thermoformed to provide a fairly semi-rigid structure. It is to be noted that record 13 which is not a part of this invention is a circular disc and will have thousands of extremely fine grooves formed in its recorded portion 14. The particular disc illustrated is a videodisc and has a pair of elongated apertures 15. Each aperture has an outer edge 16, an inner edge 17 and a pair of end edges 18. Apertures 15 are of arcuate configuration and cooperate with a center hole 20 to provide the coupling means for a driving unit on an unillustrated player table.

The thermoformed tray 11 is of generally rectangular configuration and extends beyond the perimeter of disc 13. Side 21 of the tray is formed with a finger grip 22 that enables one to slide out the tray from a record jacket (unillustrated). In order to form a tray from a relatively thin sheet material into a semi-rigid structure, radially extending ribs 25 are provided. The corners of the tray may be further strengthened by forming recessed pockets 26 in each of them.

Figure 4:
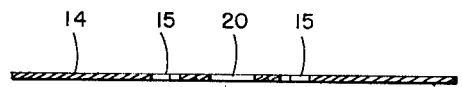
FIG. 4 is a side view in cross-section taken along line 4—4 of FIG. 2.
Figure 5:
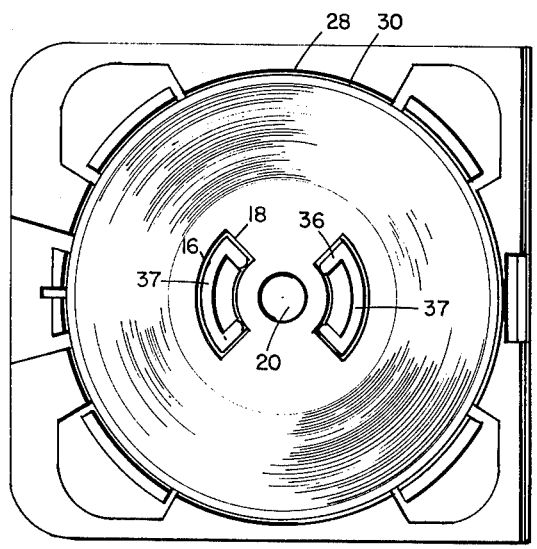
FIG. 5 is a top view of the tray with a disc in it.

As shown in FIGS. 1 and 2, an integral wall 28 extends upwardly from the tray to define a cavity 29 for closely receiving disc 13. A raised central pedestal 31 extends from cavity 29 for supporting the central unrecorded portion of the disc. As seen in FIG. 4, there is a clearance between the disc edge and wall 28 of approximately one-sixteeth inch to avoid any accidental contact between the disc's recorded surface and the tray. Cooperating with pedestal 31 is a small ledge 30 adjacent wall 28 which supports the unrecorded surface at the disc's perimeter. In such a manner, the disc is suspended with no part of the tray contacting the disc's recorded surface. Upright retaining posts 33 extend from pedestal 31 and are positioned to extend through and adjacent the ends of the disc apertures 15. These posts which are diametrically opposed to each other are adjacent recessed areas 34 in the pedestal which are positioned to underly the disc apertures. Each of the retaining posts may have a pair of leg sections 36 which are transverse to the apertures and come into contact with both the inner and outer edges 16 and 17 of aperture 15. Preferably, legs 36, may be joined by an upright portion 37 that is in complemental contact with the outer edge 16 of the arcuate aperture.

Disc 13 may be placed on tray 11 by grasping the pair of inner edges 17 defining apertures 15. The disc may thus be lifted without coming into contact with any grooves of the recording. The disc is positioned with the posts 33 on the tray extending through disc apertures 15, thereby permitting pedestal 31 to come into contact with the central unrecorded portion of the disc and ledge 30 with the disc's perimeter.

To remove the disc from the tray after the tray has been pulled from a paperboard jacket, one need merely use the thumb and middle finger to again grasp the inner edges 17 of apertures 15. This is easily accomplished in view of the recessed areas 34 which are underneath the disc apertures. In such a manner the disc can be safely removed from its package and placed on a suitable turntable. This tray may hold one or more discs to the extent that the depth of cavity 29 and height of posts 33 have been accordingly dimensioned. If more than one disc is to be placed on the tray it is essential that apertures 15 of each disc are in alignment. Otherwise, one would not be able to extend his fingers into the recesses 34 of the tray for gripping a single disc. The alignment of these apertures in several discs can be assured by the design of the retaining posts in this structure. Legs 36 of posts 33 prevent unwanted rotation of one or more discs in the package while being stored or shipped. The arcuate portion 37 of each post 33 provides a visual aid as well as additional support for correctly postitioning the arcuate slots of a disc thereon in only the 3 and 9 o'clock positions of the clock.

To assure retention of the disc in the tray a cover (not shown) may be hinged to an edge of the tray. This cover may have complemental surfaces which contact unrecorded portions of the record similar to pedestal 31 and ledge 30. It is also apparent that one could form one of the sets of retaining posts 33 on the cover instead of the tray.

I claim:

1. A packaging tray for an entertainment disc having at least two elongated apertures in its central unrecorded portion comprising: an integral disc platform having a wall extending upwardly therefrom defining a cavity for closely receiving the disc, a raised central pedestal extending from said cavity in supporting contact with an unrecorded central portion of the disc, upright retaining posts extending from said pedestal and positioned to extend through and adjacent the ends of the disc apertures, and recessed areas in said pedestal underlying the disc apertures.

2. A packaging tray in accordance with claim 1 in which said recessed areas in said pedestal extend to at least the inner edges of the disc that define the disc apertures thereby providing finger grip access to the disc aperture edges.

3. A packaging tray in accordance with claim 2 in which said retaining posts include an upright portion for complemental contact with an outer side of each elongated aperture in the disc.

4. A packaging tray in accordance with claim 3 in which said retaining posts are diametrically opposed in said central pedestal.

5. A packaging tray in accordance with claim 4 in which said retaining posts' portion in contact with the outer sides of the disc apertures are arcuate to conform therewith.

6. A packaging tray in accordance with claim 5 in which said retaining posts adjacent the ends of the disc apertures are transverse to the apertures.

7. A packaging tray in accordance with claim 6 in which said retaining posts adjacent the ends of the disc apertures are in contact with the inner and outer disc edges defining the apertures.

* * * * *